US012348537B2

(12) United States Patent
Bebchuk et al.

(10) Patent No.: US 12,348,537 B2
(45) Date of Patent: *Jul. 1, 2025

(54) DETERMINING TRUSTED FILE AWARENESS VIA LOOSELY CONNECTED EVENTS AND FILE ATTRIBUTES

(71) Applicant: Code42 Software, Inc., Minneapolis, MN (US)

(72) Inventors: Bradley David Bebchuk, St. Louis Park, MN (US); Elizabeth Verity Hammon Macgregor, Denver, CO (US); Rohit Kumar Bagda, St. Paul, MN (US); Shane Zako, Minneapolis, MN (US); Trevor Michael Tungseth, New Hope, MN (US); Nicholas Alexander Winninger, Minneapolis, MN (US); Erik Allan Hagen, Minneapolis, MN (US); Eric Tracy Christensen, Golden, CO (US)

(73) Assignee: Code42 Software, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,288

(22) Filed: May 8, 2024

(65) Prior Publication Data

US 2024/0364713 A1 Oct. 31, 2024

Related U.S. Application Data

(63) Continuation of application No. 17/468,285, filed on Sep. 7, 2021, now Pat. No. 12,003,518.

(51) Int. Cl.
*H04L 9/40* (2022.01)
*G06F 16/16* (2019.01)

(52) U.S. Cl.
CPC ........ *H04L 63/1416* (2013.01); *G06F 16/164* (2019.01); *H04L 2463/121* (2013.01)

(58) Field of Classification Search
CPC ........... H04L 63/1416; H04L 2463/121; G06F 16/164
See application file for complete search history.

(56) References Cited

U.S. PATENT DOCUMENTS 8,832,780 B1 * 9/2014 Sarin .................. G06F 21/6245
726/1
8,893,223 B1 * 11/2014 Dodke ................ G06F 21/6209
726/1

(Continued)

OTHER PUBLICATIONS

"U.S. Appl. No. 17/468,285, Non Final Office Action mailed Oct. 4, 2023", 8 pgs.

(Continued)

*Primary Examiner* — Thaddeus J Plecha
(74) *Attorney, Agent, or Firm* — Schwegman Lundberg & Woessner, P.A.

(57) ABSTRACT

Disclosed in some examples are methods, systems, devices, and machine-readable mediums which monitor for file system element transfers to and from both the endpoint and authorized accounts on network-based service providers (e.g., cloud-based storage). The system uses the capabilities of monitoring both the network-based service and the client computing device to filter out legitimate uploads to authorized network-based services and legitimate downloads to authorized computing devices. By matching events, it filters out events that are likely legitimate, the system may provide more accurate information, notifications, awareness, and unmatched event indications.

20 Claims, 6 Drawing Sheets

(56) References Cited

U.S. PATENT DOCUMENTS

| | | | |
|---|---|---|---|
| 10,148,694 B1* | 12/2018 | Sarin | H04L 63/14 |
| 12,003,518 B2* | 6/2024 | Bebchuk | G06F 16/1734 |
| 2020/0201827 A1 | 6/2020 | Chacko | |
| 2022/0129353 A1* | 4/2022 | Bhagi | G06F 11/3034 |
| 2023/0076201 A1 | 3/2023 | Bebchuk et al. | |

OTHER PUBLICATIONS

"U.S. Appl. No. 17/468,285, Response filed Jan. 4, 2024 to Non Final Office Action mailed Oct. 4, 2023", 10 pgs.

"U.S. Appl. No. 17/468,285, Notice of Allowance mailed Jan. 29, 2024", 10 pgs.

* cited by examiner

DETERMINING TRUSTED FILE AWARENESS VIA LOOSELY CONNECTED EVENTS AND FILE ATTRIBUTES

PRIORITY APPLICATIONS

This application is a continuation of U.S. patent application Ser. No. 17/468,285, filed Sep. 7, 2021, the content of which is incorporated herein by reference in its entirety.

TECHNICAL FIELD

Embodiments pertain to automated detection of potential security threats in computing systems. Some embodiments relate to automated detection of document exfiltration that occurs via a network-based service, such as a network-based cloud storage service.

BACKGROUND

Companies with valuable data stored electronically such as source code, customer lists, engineering designs, sensitive emails, and other documents are increasingly subject to attempts to steal that data electronically. Outsiders may attempt to hack computer networks using viruses; worms; social engineering; or other techniques to gain access to data storage devices where valuable data is stored. These attacks may be prevented or monitored by network security software such as firewalls and anti-virus detection programs.

In addition to external actors, another threat to the security of this data is from exfiltration of the data by insiders. Insiders may be employees, contractors, or other individuals that are authorized to access the computing systems where this data is stored or accessible. These insiders may copy employer data as a result of greed, revenge, a desire to help a new employer, mistake, or other motivations. In addition to cases of malicious exfiltration such as theft, in some examples, it may be possible that users have exfiltrated data by accident. For example, by uploading data to the wrong site or account.

Regardless of the motivation, organizations are interested in detecting this exfiltration. Detecting insider threats is particularly difficult because many of the traditional methods of detection and prevention do not work as these individuals were granted access to the computing systems where the data is stored or accessible. For example, a company may be alerted to an external attack by the attacker trying a number of different combinations of passwords and usernames hoping that one will work. Since insiders are already authorized, these traditional signals are of no use in detecting insider data exfiltration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
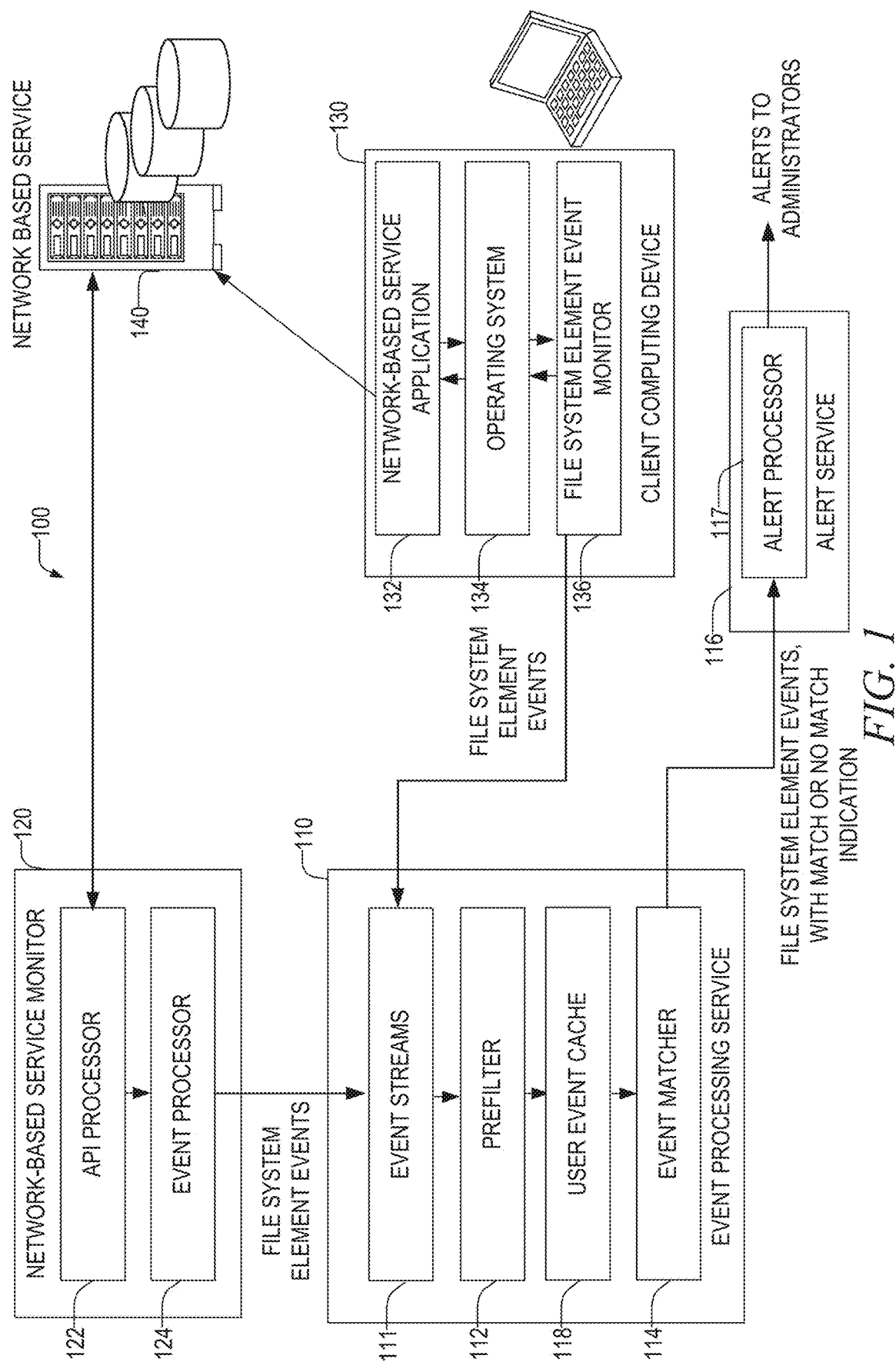
FIG. 1 illustrates a logical diagram of a system including a network-based service monitor, a file system element event monitor on a client computing device, an alert service, and an event processing service according to some examples of the present disclosure.

One particularly difficult method of exfiltration to detect is the exfiltration of data using a network-based service such as a cloud-based file storage or email system. Users may upload one or more files from an authorized computing device to an unauthorized account on a cloud-based file storage system or download one or more files from an authorized account on a cloud-based file storage system to an unauthorized computing device. While applications on user endpoints may detect file system element events, such as file upload events or file download events, there is no way to detect if an upload to the cloud-based file storage account is authorized or not. For example, an upload event may result from a user uploading a legitimate file to an authorized cloud storage account for use in their work. Similarly, while some systems such as cloud application security brokers (CASB) and Secure Access Service Edge (SASE) may monitor activity on the cloud-based file storage, this activity may likewise be legitimate. For example, users may download files from their authorized cloud based storage account to an authorized computing device (e.g., one provided by the organization that owns the data). Generating data or alerts from each of these events causes a massive amount of data to be generated-most of which is not indicative of any malfeasance. This makes it difficult for administrators to stop user exfiltration of sensitive data.

Disclosed in some examples are methods, systems, devices, and machine-readable mediums which more accurately detect exfiltration of data by monitoring both the endpoint and authorized accounts on network-based service providers (e.g., cloud-based storage) for file system element events indicating transfers to and from both the endpoint and the authorized accounts on network-based service providers. The system uses the capabilities of monitoring both the network-based service and the client computing device to filter out legitimate uploads to authorized network-based services and legitimate downloads to authorized computing devices. In some examples, the system may attempt to match a file system element event on the network-based service provider with a corresponding file system element event on the client device. Events from the client device that are not matched with a corresponding event on the network-based service may indicate exfiltration from an authorized client device to an unauthorized account on a network-based service (or to an unauthorized network-based service). Likewise, events from the authorized network-based service that do not have matching events on an authorized client device may represent exfiltration from an authorized network-based service account to an unauthorized client device. By determining events that are likely legitimate, the system may provide more accurate information to administrators.

The system may indicate which file system element events are matched and which are unmatched. These file system element events may then be provided to an alert service that may consider the matched, or unmatched events as well as other signals to determine whether to raise an alert to an administrator. In other examples, the system may simply raise an alert when an unmatched event is found.

As used herein, a file system element is one of a directory (e.g., folder) or a file. File system elements can include meta data and content. For example, in the case of a directory, the meta data can include a name, path, creation date or time, modification date or time, deletion date or time, permissions, corresponding markers (e.g., icons), etc., and the content can include the files or directories contained within the directory. In the case of a file, the meta data can include all of the meta data described above for a directory and also include application affiliation (e.g., what application created the file, what application can read the file, etc.), and the content can include the bits of the file. In some examples, a file system element event is a change in a status of a file system element on a filesystem. Example file system element events include file system element creation, modification, deletion, opening, moving, or the like.

In some examples, the system utilizes two event streams. A first event stream may be generated from a file system element event monitor application installed on authorized client computing devices (e.g., a user's computing device). The file system element event monitor application may be installed by an administrator of the client computing device or may be required to be installed by a policy of the administrator as a condition to granting access to computer resources managed by the administrator. The file system element event monitor application monitors for file system element events at the client device. For example, the file system element event monitor application may interface with the operating system of the computing device to receive a notification of when a file system element (e.g., a file) is created, deleted, moved, modified, opened, uploaded, downloaded, or otherwise touched. In some examples, the operating system may not provide a notification that a file system element was uploaded or downloaded, but the file system element event monitor application may infer that based upon other events (e.g., file open, creation, deletion, or the like) and the sources of those events (e.g., if the event was generated by an application of a network-based service). The file system element event monitor application on the client device places an event in the first event stream when a file is uploaded to an external location or downloaded from an external location.

The second event stream may be generated by a network-based monitoring service which monitors activity on one or more network-based services for authorized users for an organization. For example, the organization may have cloud-based computing accounts for users and the organization may grant the network-based service monitoring service access to events associated with users of the organization. The network-based service monitoring service may monitor for transfers to, or from the authorized account of the user. When a file system element (e.g., a file or directory) is transferred to or from the network-based service, the network-based monitoring service may place an event in the second event stream.

As previously described, transfers between a user's authorized computing devices and authorized cloud-based file storage accounts will likely have corresponding events in both event streams. For example, a transfer from an authorized client computing device to an authorized network-based service account will have an event generated on the client computing device that a file was uploaded, and another event generated on the network-based service that a same file was uploaded. When the system detects an upload on the client computing device, but no corresponding event on the cloud-based file storage account of that user, the system may mark the event as unmatched. In other examples, the system may provide an alert to an administrator as this may indicate that the user uploaded the file to an unapproved network-based service (or an unapproved account-such as a personal account on an approved network-based service). Similarly, a transfer from an authorized network-based service account to an authorized client computing device will have an event generated on the network-based service that a file was downloaded, and an event generated on the client computing device that a same file was downloaded. When the system detects a download from the cloud-based file storage account of that user, but not a corresponding download to an authorized device, the system may mark the event as unmatched. In other examples, the system may generate an alert to an administrator as this may indicate that the user downloaded the file from an authorized network-based service to an unauthorized client computing device.

In examples in which the events are marked as matched or unmatched, all events may be sent to, and processed by an alert service which may further process the events along with other signals to determine whether a threat is present. If a threat is present the alert service may provide an alert to an administrator. Alerts may be provided as visual, auditory, or the like and may be provided through a Graphical User Interface (GUI), a User Interface (UI), a text, an email, a voicemail, a pager alert, or the like.

The presently disclosed techniques thus solve a technical problem of detecting data exfiltration to an unapproved network-based service account from an approved client computing device or from an approved account on a network-based service to an unapproved client computing device. The presently disclosed techniques solve this technical problem using the technical solution of monitoring each authorized source and destination and by matching events from disparate event streams from each potential destination and source. If a pair of events match, the file was likely uploaded or downloaded to an approved location the events may be less likely to indicate malfeasance. This reduces the number of false alarms that may be generated from monitoring a single event stream. False alarms may generate unnecessary network traffic (the unmatched event indication); processing resources (to display the unmatched event indication); and potentially other resources (network, processor, and other resources) as the unmatched event indication is investigated by a user. The prevention of false alarms thus improves the functioning of these computing systems. If there is not a match, the event may be marked as not matching or an alert may be generated, either of which may assist in the detection of security threats.

FIG. 1 illustrates a logical diagram of a system 100 including a network-based service monitor 120, a file system element event monitor 136 on a client computing device 130, an event processing service 110, and an alert service 116 according to some examples of the present disclosure. Client computing device 130 may be a desktop, laptop, mobile phone, tablet, or the like. Client computing device 130 may include an operating system 134. The operating system 134 may provide one or more file systems and may provide applications, such as the network-based service application 132 and the file system element event monitor 136 access to the file system. In some examples, the operating system 134 may provide information to the file system element event monitor about file system element events. Example events may include a copy event, a delete event, a move event, a rename event, a creation event, an open event, an upload event, a download event, and the like. The events may include metadata about the event, such as a file system element name, location, size, content hash, type of event, timestamp, metadata of the file system element event, the application that caused the event, and the like.

File system element event monitor 136 monitors for file uploads and file downloads from the network-based service application 132. In some examples, the upload and download events are detected by the operating system 134. In other examples, the file system element event monitor 136 may infer a file upload and/or download from other events. These events may be inferred based upon a creation or open event and the source of the event—e.g., that the event originated from a network-based service application 132.

The network-based service application 132 may be an application that interfaces with the network-based service 140. The network-based service application 132 in some examples may monitor one or more directories (e.g., folders) on the filesystem of the client computing device 130 for any new file system elements, modifications to existing file system elements, deletion of file system elements, or the like and then synchronizes those changes with the file system of the network-based service 140 associated with the account of the user. In other examples, the network-based service application 132 may be an application that executes within a general purpose application such as a browser. The application may be provided by the network-based service 140 through one or more Graphical User Interface (GUI) descriptors. For example, Hypertext Markup Language (HTML), cascading style sheets (CSS), scripting files, plugins, and the like. Network-based service 140 may be a file backup, file sharing, file storage, communication service (e.g., email service), or any network-based service in which file system elements may be stored or may be transmitted to and/or from.

In examples in which the operating system 134 does not provide upload or download events, the file system element event monitor 136 may infer upload and/or download events from other file system element events and/or other information provided by one or more applications. For example, an upload event may be inferred by an event for a file system element within one or more directories associated with the network-based service 140 that are directories that are synchronized to the network-based service 140. For example, a file create event or a file copy event with a target directory that is a directory synchronized to the network-based service 140 (or a different network-based service 140). The directory synchronized to the network-based service 140 may be prespecified based upon a mapping or may be learned from registry key settings or other settings. In the example where the network-based service application 132 is a browser, the system may, for example, detect file upload or download events when a file system element event indicates an access or creation of a file by a browser where a URL is being accessed at a time the event was generated that is associated with a known network-based service 140. More details on detecting events from browser based detection may be found in U.S. patent application Ser. No. 17/242,843 entitled "Application-Based File Exfiltration Detection," which is hereby incorporated by reference in its entirety.

File system element event monitor 136 may be implemented as, or include a filter, mini filter, or the like that interfaces with an input/output (I/O) stack of the operating system 134. In other examples, file system element event monitor 136 may subscribe to an event stream of file system element events provided by operating system 134. In some examples, file system element event monitor 136 may obtain, from the operating system 134, or other sources, information about the file system element event such as the name of the file system element(s) involved in the event, location, size, content hash, type of event, account that is logged in, timestamp, and the like. File system element event monitor 136 may also obtain information about the network-based service 140 that is the target of the event. For example, if the file was moved to a directory associated with a particular network-based service, such as "C:\Users\<username>\Dropbox" the system may associate the event as an upload to the DROPBOX® service. The file system element event monitor 136 may determine the locations associated with particular network-based services through access to the system registry or another database (e.g., which may be provided by the event processing service 110). In other examples, default locations may be used for various known network-based services. In yet other examples, in the case that the network-based service application is a browser, file uploads and other information may be identified as described in U.S. patent application Ser. No. 17/242,843 entitled "Application-Based File Exfiltration Detection." In that disclosure, the system determines browser based activities based upon identifying a file system element event accessed by a browser that is not part of an excluded list of locations (to exclude normal browser behavior such as caching behavior) and by obtaining information about the pages that the browser is visiting. The page history may be determined by accessing the browser's history database. File system element events indicating uploads to, or downloads from pages associated with network-based services may be flagged as upload and/or download events (respectively). The URL of the page that is being accessed may be associated with particular network-based services (e.g., network-based service 140).

File upload and download events (and other events) may be sent by the file system element event monitor 136 to the event processing service 110. The events may be placed in one or more event streams 111. The file system element events sent to the event processing service 110 may include the file system element event information and the network-based service information determined by the file system element event monitor 136. This additional information may be used in matching events by the event processing service 110.

The network-based service monitor 120 may utilize an application programming interface (API) provided by the network-based service 140 that is implemented by an API processor 122 to communicate with the network-based service 140. The network-based service monitor 120 may monitor accounts associated with an organization on the network-based service 140. This monitoring may be in many forms, which may depend on the API provided by the network-based service 140. Examples include a subscription with the network-based service 140 for event notifications when one or more events occur; periodic event polling for new events; and receiving periodic activity logs from which events can be extracted.

Example file system element events received using the API may include creation events when a file system element is created, open notifications when a file system element is opened, deletion events when a file system element is deleted, file move events when a file system element is moved, upload events when a file system element is uploaded to the service, download events when a file system element is downloaded from the service, modification events when a file system element is modified, and the like. In some examples, the file upload or download event notifications are identified and provided by the network-based service 140 and sent to the network-based service monitor 120. In other examples, the occurrence of an upload or download may be inferred from other event notifications received from the network-based service. For example, a creation event may be presumed to be a file upload. An open request may be inferred to be a download, and the like.

The events may be received by the API processor 122 and handled by an event processor 124. The event processor may reformat the event received from the network-based service, request more information about the event from the network-based service 140, or the like. In examples in which the upload or download event is not directly indicated in a notification from the network-based service, the event processor 124 may execute the algorithms used to make these inferences. The processed upload or download events may be sent to the event processing service 110, where it may be placed in the event stream 111. In examples in which the network-based service 140 sends logs of user activity, the event processor 124 may generate events from these logs including performing inference that may be necessary as previously described. The event processor 124 and/or the API processor 122 may obtain, from the network-based service 140, or other sources, information about the file system element event such as the name of the file system element(s) involved in the event, location, size, content hash, type of event, timestamp, user account id, and the like. In addition, the network-based service monitor may also obtain information about the client device that is the target of the event, if the network-based service will provide that information. Example information may include an IP address, device type, network-based service application type, and the like. This extra information may also be sent to the event processing service 110 as part of the file system element events. This additional information may be used in matching events by the event processing service 110.

Network-based service monitor 120 and event processing service 110 may be executed by a same or different computing device or group of associated computing devices. For example, both the network-based service monitor 120 and event processing service 110 may be provided by a same network-based computing service and may be provided by a same server or group of servers. In other examples, they may be provided by different network-based computing services and/or different servers or groups of different servers. In still other examples, the network-based service 140, network-based service monitor 120, and event processing service 110 may be executed by a same or different computing device or group of associated computing devices. In some examples, the alert service 116 may be provided by a same or different computing device of group of associated computing devices that provides the event processing service 110 and/or the network-based service monitor 120.

In some examples, event stream 111 may be two separate streams, one for network-based service monitor 120 and client computing device 130. As previously noted, the matching of events is done on a per-user basis. As can be appreciated, a user may have several different accounts they use to login to the client computing device 130, the network-based service 140, and the like. The prefilter 112 attempts to correlate these different accounts to a same user for later matching. Prefilter 112 may identify user identification information (e.g., an account identifier, a device identifier, or the like) provided with each of the events in the event streams 111 and map that user identification information to a common user identifier. The prefilter 112 may then place the event in the user event cache 118 of that common user identifier for matching.

Common user identifiers may be identified based upon a mapping of the user identification information from the event to the common user identifier. For events originating on the network-based service, the user identification information may be account of the network-based service where the event was observed. For events originating on the client computing device, the user identification information may be an account that is logged in at the time the event is generated, an IP address, a MAC address, a hardware ID (e.g., a Universal Unique Identifier for a device), and the like.

The common user identifier may map a number of different user identification information on different event sources to a common user. To determine the mapping, in some examples, an administrator may define the mapping between user identification information provided by the file system element events provided by the client computing device and the network-based service. In other examples, the mapping may be done automatically based upon commonalities in user identification information. For example, the user account identifiers for the network-based service may be the same as the user accounts for the authorized computing devices. In some examples, the system may use user matching rules. For example, the account identifier of the client computing device 130 may be "bob" and the account of the network-based service 140 may be "bob@example.com" and the user matching rules may instruct the system to match only the portion of the account of the network-based service 140 prior to the @ symbol.

In addition to identifying events from a same user across different source types, the prefilter 112 may filter out events that are not of interest and places events that are of interest and that are associated with a same user into a cache for the same user in the user event cache 118. The user event cache 118 may hold events for a specified period of time such that events from the network-based service monitor 120 may be matched with events from the client computing device 130. If, after expiration of the specified period of time since the event was received, an event in the user event cache 118 has not been matched to another event, the event may be marked as unmatched. This indicates that the upload or download does not have a matching event in either the network-based service 140 or the client computing device 130. This indicates that exfiltration to unauthorized network-based services or computing devices may be occurring.

As events are added to the user event cache 118, the event matcher 114 may try and match, for each managed user, upload events received from the client computing device 130 with upload events received from the event processing service 110 and download events received from the client computing device 130 with download events received from the network-based service monitor 120. That is, events associated with a first user from a first source type may be matched with events associated with the same first user from a second source type. As noted, events are matched per-user and a separate user event cache 118 may be setup for each distinct user. In other examples, the user event cache 118 may be a single event cache 118 for all users of an organization. In still other examples, the user event cache 118 may be for all users of all organizations serviced by the event processing service 110. Events may be checked for a match upon entry into the user event cache 118. In other examples, events may be cached and then later checked for a match (e.g., periodically). In these examples, each possible combination of event pairs in the user event cache 118 formed from a first event from a monitored network-based service monitor (e.g., network-based service monitor 120) and a second event from a client computing device (e.g., client computing device 130) pertaining to a same user may be checked for a match.

File system element events may have metadata which indicates whether the event was matched. In some examples, for cases where a match is found, the indication of a match may include an identifier of the matching event. In some examples, all the file system element events may then be sent to the alert service 116. Alert processor 117 of the alert service 116 may analyze the events, including the unmatched events, along with other signals and may determine whether to issue an alert to an administrator. In some examples, rather than sending the unmatched events to an alert service 116, the system may simply raise an alert. In either case, alerts may be provided to administrators. For example, the system may provide one or more graphical user interfaces (GUIs) for administrators and unmatched event indications may be shown in the GUI to the administrator.

Matches between a pair of events may be determined based upon a number of factors or scores. For example, events may first be checked to determine if they are referring to a same file (a file equality score) based upon file metadata such as a file hash and/or file size. In some examples, file hash matching is a Boolean check—that is, the file hashes for the pair of events either match or not. If they match, they receive a specified number of points for the file equality score. If they do not match, they receive fewer points, no points, or negative points for the file equality score. This is because small changes in the file contents may produce large changes in the hash. In other examples, a fuzzy hash may be used and similarity in hash may be considered and the score may depend on the similarity in hash.

It may be expected that minor variations in file size may be expected due to the addition of metadata and/or different reporting of sizes based upon the platforms, however, major differences in sizes may signal that the events do not match. In these examples, the system may generate a file equality score that measures whether the file hash matches and how close the file sizes of each event are to each other. The file equality score may weight the hash and the file size differently. For example, the hash may make up a larger component of the score than the file size component. At any rate, the sum of the hash score and the file size score may equal the file equality score.

In some examples, in addition to, or instead of the file equality score, the system may also calculate a confidence score that indicates a calculated confidence that the events are matching. In some examples, the confidence score of a first event of the event pair matching a second event of the pair may be based upon one or more of: a determination of whether the event types match (e.g., upload to a network-based service and upload from the client computing device 130); whether the URL or file system location for the event on the client computing device is consistent with known locations and/or URLs of the network-based service 140 where the second event originated; whether a parent drive identifier of each event matches, how close in time the timestamps of when the first event occurred (as opposed to when it was received) relative to the second event; and/or other factors. The parent drive identifier may be obtained at the client device from a URL associated with the event (which may be obtained by querying the browser in response to detecting the event). For example, Google Drive lists the parent drive identifier as a list of numbers after the path in the URL and this gives the system the folder id of the current folder. The folder id of events from the network-based service may be provided by the network-based service.

In some examples, each factor may produce a subscore and the confidence score is a weighted or unweighted summation of the subscores. In examples in which the factors (e.g., parent id, event type, whether the URL or file system location for the event on the client computing device is consistent with known locations and/or URLs of the network-based service where the second event originated) are Boolean (either they match or do not match), the score may be a defined value when they match and a defined value when they do not match. In some examples, for the timestamp subscore, the closer the relative times of each event the higher the score until a cutoff (e.g., a four minute cutoff) at which point the subscore is zero.

Weights for the summation algorithm may be determined based upon manual inputs from an administrator, set by a machine learning algorithm based upon feedback from administrators on which unmatched event indications that get generated are really evidence of exfiltration and which are not nefarious, and the like.

In some examples, event pairs whose file equality scores exceed a first threshold and whose confidence score exceeds a second threshold may be considered a match (the first and second thresholds may be the same or different). Event pairs where the file equality scores do not exceed the first threshold or whose confidence scores do not exceed the second threshold may not be considered a match and the file confidence score may not be calculated. In some examples, the file equality score may be compared to the first threshold, and if the file equality score transgresses the first threshold, then the confidence score may be calculated. In yet other examples, both the file equality score and the confidence score may be combined into a single score and compared with a single threshold to determine if the events match. In still other examples, the file hash match may be an important factor. That is, if the hashes do not match, the event may not be considered a match. In these examples, the system may only look at event pairs where both the first and second hashes match. This may simplify the analysis so that events with non-matching hashes are not analyzed.

In some examples, the file hash may be an important factor—that is, the file may not be considered a match unless the hashes match. In these examples, certain processing optimizations may be made. For example, a hash table or list of file hashes may be stored. A new file system element event from a first source type (either the network-based service or the client computing device 130) may only be compared against other file system element events from a second source type (the other of the network-based service or the client computing device) whose hash matches. Those events may be quickly located using the hash table or list of file hashes. This hash table or list may point to events in the user event cache 118 with a particular file hash.

As noted above, the system detects both when a file upload of a client computing device 130 is not to a monitored network-based service but also detects when a file is downloaded from a network-based service 140 to a computing device that is not a monitored client computing device 130 with a file system element event monitor 136.

Note that in FIG. 1, a single client computing device and network-based service 140 are shown. Additional network-based services may be monitored by the network-based service monitor 120 or by additional network-based service monitors. Likewise, additional client computing devices 130 may be monitored by additional instances of the file system element event monitor. These additional monitoring applications may all send their data to the same event processing service 110. The event matcher 114 may match events originating from one or more network-based services with events originating from one or more client computing devices for a user. The event processing service 110 may also perform the matching for multiple users and may utilize multiple user event caches 118.

Figure 2:
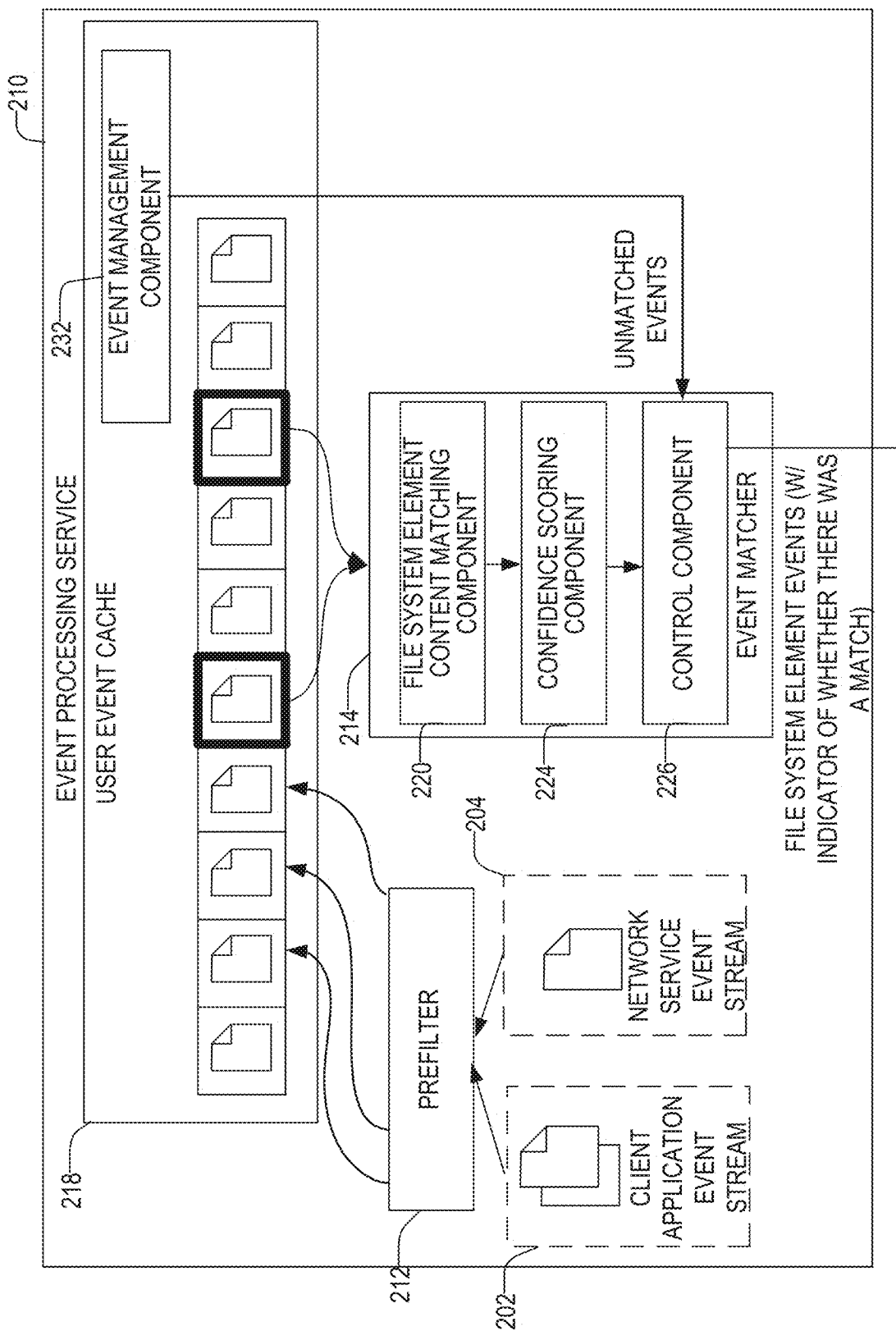
FIG. 2 illustrates an event processing service according to some examples of the present disclosure.

FIG. 2 illustrates an event processing service 210 according to some examples of the present disclosure. Event processing service 210 may be an example of event processing service 110 of FIG. 1. Events may be placed in the client application event stream 202 and the network-service event stream 204. Prefilter 212 may pull events from the client application event stream 202 and network service event stream 204 that have event types that match a list of prespecified event types that the system is interested in. For example, file upload or download events for client computing devices, new file detected, file modified, or file download events for the network-based service. Prefilter 212 may then determine the user that these events are associated with and may then deposit these events into the user event cache 218 of the particular user. User event cache may be an example of user event cache 118 of FIG. 1. Event management component 232 manages the events in the user event cache 218. For example, by allocating memory for an event, deallocating memory for events, providing events to the event matcher 214 and the like. In some examples, events from the client application event stream 202 and network service event stream may be placed in the user event cache 218 based upon order of arrival. In other examples, events from the client application event stream 202 and network service event stream may be placed in different locations of the user event cache 218. In still other examples, events from the client application event stream 202 and the network service event stream may be placed in different user event caches 218. In yet other examples, the system may keep a mapping of which events in which positions in the cache belong to which stream for easier matching of events.

Prefilter 212 may be an example of prefilter 112 of FIG. 1 according to some examples of the present disclosure. As previously described, prefilter 212 may determine a user identifier that uniquely identifies a user within the event processing service 210 for events. This user identifier is then used to select an appropriate user event cache 218. This may be based upon a correspondence between the user identifier and an account for the client computing device and an account of a network-based service (e.g., such as a cloud based storage service). In some examples, the system may use a table or other structure to associate user identifiers, computing device user identifiers, and user identifiers of the network-based service. In still other examples, the user identifiers may be the same or may be derivable from each other according to a schema. For example, a network-based service may use an email address and the client computing device may have a username portion of the email address as a user identifier. That is, the client computing device may have a username ("bob") and the network-based service may have the username ("bob@example.com") with an organization's network address appended. The schema is then to use the identifier of the network-based service before the '@'.

As shown in FIG. 2, separate user event caches 218 are maintained for each user. In these examples, the user matching of the prefilter 212 is executed prior to putting the events in the cache. The event matcher 214 may then attempt to match events that are placed in the user event cache from a first source type with events in the user event cache from a second source type. In some examples, the event matcher 214 tries to immediately match a newly arrived event from a first source type to other events previously stored in the user event cache 218 from a second source type. A source type is either a client computing device or a network-based service. In other examples, a single event cache may be maintained for all users. In these examples, the user matching of the prefilter 212 may find matching events from a same user from different source types from the event cache and pass those to the event matcher 214.

Either way, once the event matcher 214 has a first and second event that are from a same user and from different event streams (e.g., different source types), the events are passed to the file system element content matching component 220. Event matcher 214 may be an example of event matcher 114 of FIG. 1 according to some examples of the present disclosure. Event matcher may evaluate events in the event cache from the same user to determine which event match. For example, if a first event from the client application event stream 202 and a second event from the network service event stream 204 match. In some examples, each new file system element event from the client device that is placed in the user event cache 218 may be checked for a match by the event matcher 214 against all file system element events from the network-based service that are presently in the user event cache 218. Likewise, each new file system element event from the network-based service that is placed in the user event cache 218 may be checked for a match by the event matcher 214 against all file system element events from the client computing devices. In other examples, rather than check events immediately, events in the event queue may be processed periodically to determine if two events match. In these examples each event from a first source type may be checked against events from a second source type and vice-versa to find matching events.

File system element content matching component 220 performs file equality scoring to determine whether the file system element events match for the compared events. As noted, before, the file system element content matching component 220 may calculate a file equality score based upon metadata about the file system element such as hashes of the contents of file system elements and the file system element sizes. For example, the system may assign the event pair being considered a determined number of points if the file hashes in the first event and second event of the pair matches. The system may then also add points based upon the difference between the file sizes reported in each event. The closer the file sizes are the more points are added to the equality score. If the number of points exceeds a threshold, the file system element content matching component 220 may indicate that the file system elements that are the subject of the first event being matched matches the second event being matched.

Confidence scoring component 224 may calculate a match confidence score. While the first and second events being matched may relate to the same file, the confidence score may quantify a confidence that the two events are related. For example, the first event and the second event may involve the same file system element but not the same transaction on the file systems. In some examples, the confidence score may be based upon one or more of: a determination of whether the event types of both events match; whether the URL or file system location for the first event is consistent with known locations and/or URLs of the network-based service 140 where the second event originated; whether the parent folder of the file system element event that is the subject of the event and is reported in the event matches; how close in time the timestamps of when the first event occurred (as opposed to when it was received) relative to the second event; and/or other factors. In some examples, each factor may produce a subscore and the confidence score is a weighted or unweighted summation of the subscores. For various factors that either match or do not match (e.g., the parent folder), a match may award points and a non-match may either not award points or subtract points. In some examples, weights may be determined based upon manual inputs from an administrator. In other examples, the weights are set by a machine learning algorithm based upon feedback from administrators on which unmatched events are really evidence of exfiltration and which are not nefarious. The timestamp subscore, the closer the relative times of each event the higher the score until a cutoff (e.g., a four minute cutoff) at which point the subscore is zero.

Control component 226 may determine if the file equality score is greater than a first threshold and/or if the confidence score is greater than a second threshold. In some examples, the confidence score may not be calculated if the file equality score does not exceed the first threshold. In other examples, the file equality score may not be calculated if the confidence score does not exceed the second threshold. If both the file equality score is greater than the first threshold and the confidence score is greater than the second threshold, then the events may match. The matching events may be marked as matching and excluded from further matching attempts. In other examples, the matching events may be immediately removed from the event cache, marked as matching, and sent to the alert service 116.

The first and second thresholds may be a same threshold or different thresholds. The thresholds may be set by an administrator or set by a machine learning algorithm based upon feedback from administrators on which unmatched events are really evidence of exfiltration and which are not nefarious.

Events that match may be tagged or marked. Periodically the event cache is cleaned up by the event management component 232 to remove events that are not tagged as being matched and which are older than a threshold period of time. These events are then sent to the control component 226 for marking as unmatched and transmission, along with the matched events, to the alert service (such as alert service 116). In other examples, the unmatched events may immediately generate an alert. For example, a user may have a configuration setting that specifies that all unmatched events may automatically generate an alert. In other examples, the events in the user event cache are periodically processed, and events that are not matched and are older than a threshold period of time are sent to the control component 226 for marking as unmatched.

Figure 3:
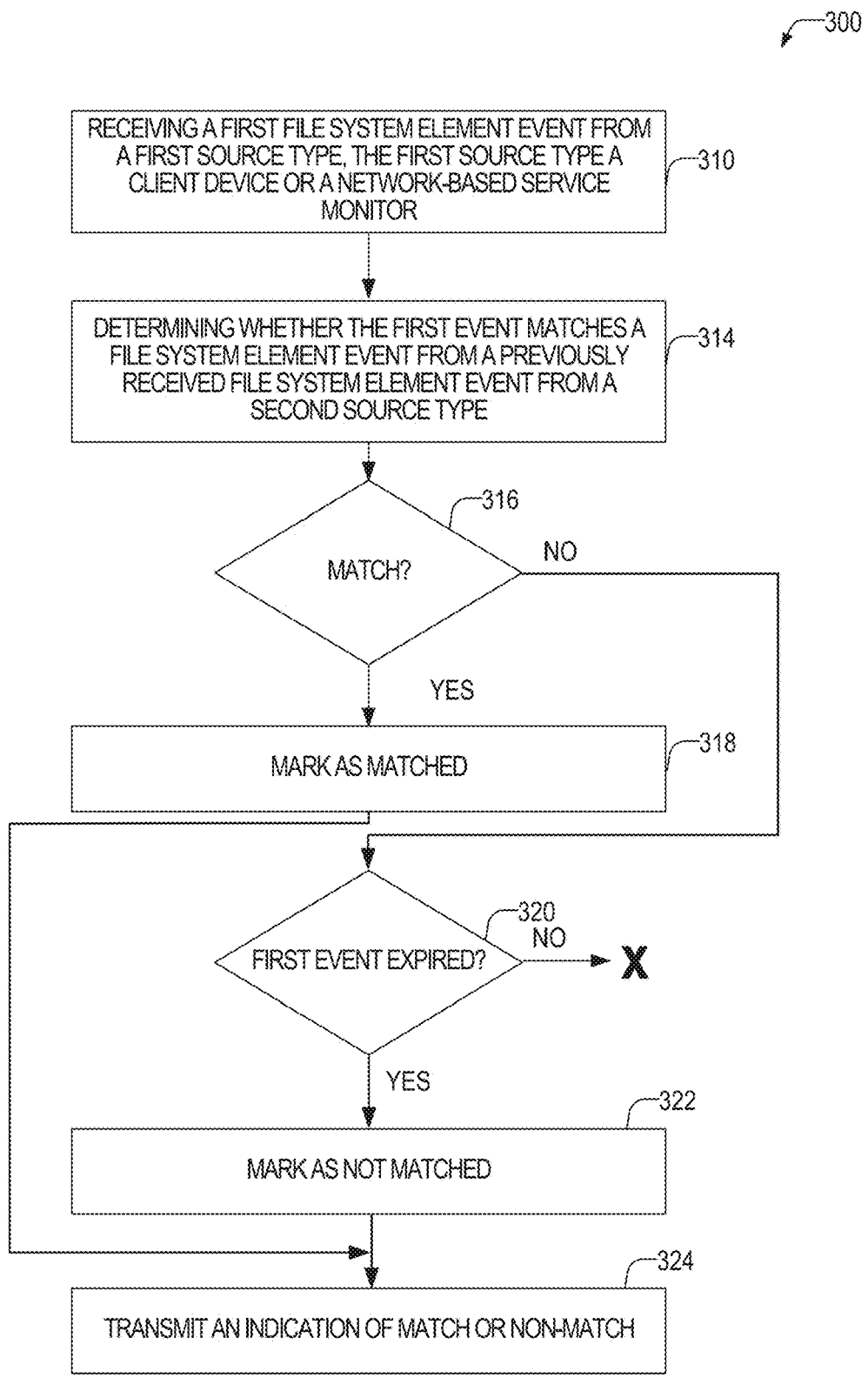
FIG. 3 illustrates a flowchart of a method of detecting potential unauthorized file exfiltration according to some examples of the present disclosure.

FIG. 3 illustrates a flowchart of a method 300 of detecting potential unauthorized file exfiltration according to some examples of the present disclosure. At operations 310 the system may receive a first file system element event from a first source type. The event may be received from an event stream and may be placed in an event cache based upon the user the event is associated with as previously described. The first source type may be a client computing device or a network-based service. The file system element event describes events associated with a file system element of a file system on the first source.

Where the source type is a client computing device, the system may receive file system element events from the client computing device, such as client computing device 130. The events may be determined using a file system element event monitor 136 that subscribes to receive file system element events from an operating system. The file system element events may be events that are indicative of uploading or downloading a file system element (e.g., to or from a network-based service) to or from the client computing device.

Where the first source type is a network-based service, the system may receive events from a network-based service monitor (e.g., network-based service monitor 120). For example, the network-based service monitor may monitor activity on the network-based service for one or more accounts. The accounts may correspond to authorized accounts for a corporate or other entity associated with the client computing device. Likewise, the accounts on the network-based service may be associated with the organization and may be sponsored by, paid for by, managed by, or otherwise sanctioned by the organization. The network-based service monitor may utilize one or more APIs to obtain events related to file system elements that are stored, managed, modified, operated upon, transit, or otherwise are associated with one of the monitored accounts of the network-based service. For example, if the network-based service is an email service, the file system element event may indicate that the user attached a file to an email. In other examples, if the network-based service is a file storage and/or sharing service, the events may be download, upload, modification, or other events.

Example file system elements may include files, directories, or the like. The network-based service may include a cloud-based file storage system, an email service, a communication service, and the like. In some examples, the file system element events may have one or more attributes such as the name of the file system element(s) involved in the event, location, size, content hash, type of event, timestamp, parent folder id, and other details of the event. The events from the client device may also include information about the network-based service that is thought to be the target of an upload or the source of a download. For example, if the file was moved to a directory associated with a particular network-based service, such as "C:\Users\<username>\Dropbox" for Dropbox® the system may associate the upload with the Dropbox® service. Likewise, if the file was created in a directory associated with a particular network-based service, such as "C:\Users\<username>\Dropbox" for Dropbox® the system may associate the download with the Dropbox® service.

At operation 314 the system may determine whether the first file system element event matches a file system element event from a previously received file system element event from a second source type. In some examples, the previously received file system element events corresponds to a same user as the first event. In some examples, the second source type is a network-based service if the first source type is a client computing device; and the second source type is a client computing device if the first source type is a network-based service. An example matching algorithm is detailed in FIG. 5.

At operation 316 a determination is made whether the first file system element event from the first source type matches any file system element events in a set of previously received file system element events from the second source type. If there is a match, then at operation 318 the events may be marked or otherwise indicated as matching. In some examples, metadata associated with the events may be set to indicate that the event matches another event. In some examples, the metadata may also identify the matching events (e.g., by storing the matching event's identifier).

If there is not a match, then at operation 320, the system may determine whether the first event has expired. The expiry check of operation 320 may be performed periodically to check for whether the first event and/or other events within one or more user event caches are expired. In some examples, the expiry is based upon a timestamp of when the event was received. That is, at operation 310 the system may record the time the first event was received. When the difference between a current time and the timestamp of the first event transgresses a specified threshold, the system may determine that the first event has expired.

At operation 322, the system may mark the event as unmatched. If the first source type of the first event is the client computing device, then the unmatched event may indicate that the user uploaded a file to an unauthorized account on a network-based service or to an unauthorized network-based service. If the first source type is the network-based service, then the unmatched event may indicate that the user downloaded a file from an authorized account of an authorized network-based service to an unauthorized device. At operation 324, the system may transmit the events to another system (e.g., an alert service 116), along with the indications of whether they are matched or not. In addition to transmitting the events to another system, or instead of transmitting the events to another system, the system may provide an alert to an administrator as previously described.

In some examples, the file system element events received by the system may be a stream of file system element events. That is, events are sent by the client device and/or a computing device that is acting as a monitor for a network-based service as they are generated. In other examples, the events may be buffered by the network-based service monitor and the client computing device and sent with a defined periodicity. The periodicity with which the events may be sent by the client device and the periodicity with which the events may be sent by the computing device that is monitoring the network-based service may be a same periodicity or a different periodicity. As noted previously, the system may scan for matches upon receiving an event, or the system may buffer events and periodically look for matches, remove them from the cache, and log them and the system may trigger the file exfiltration unmatched event indication when a file system element event in the cache expires without finding a match.

Figure 4:
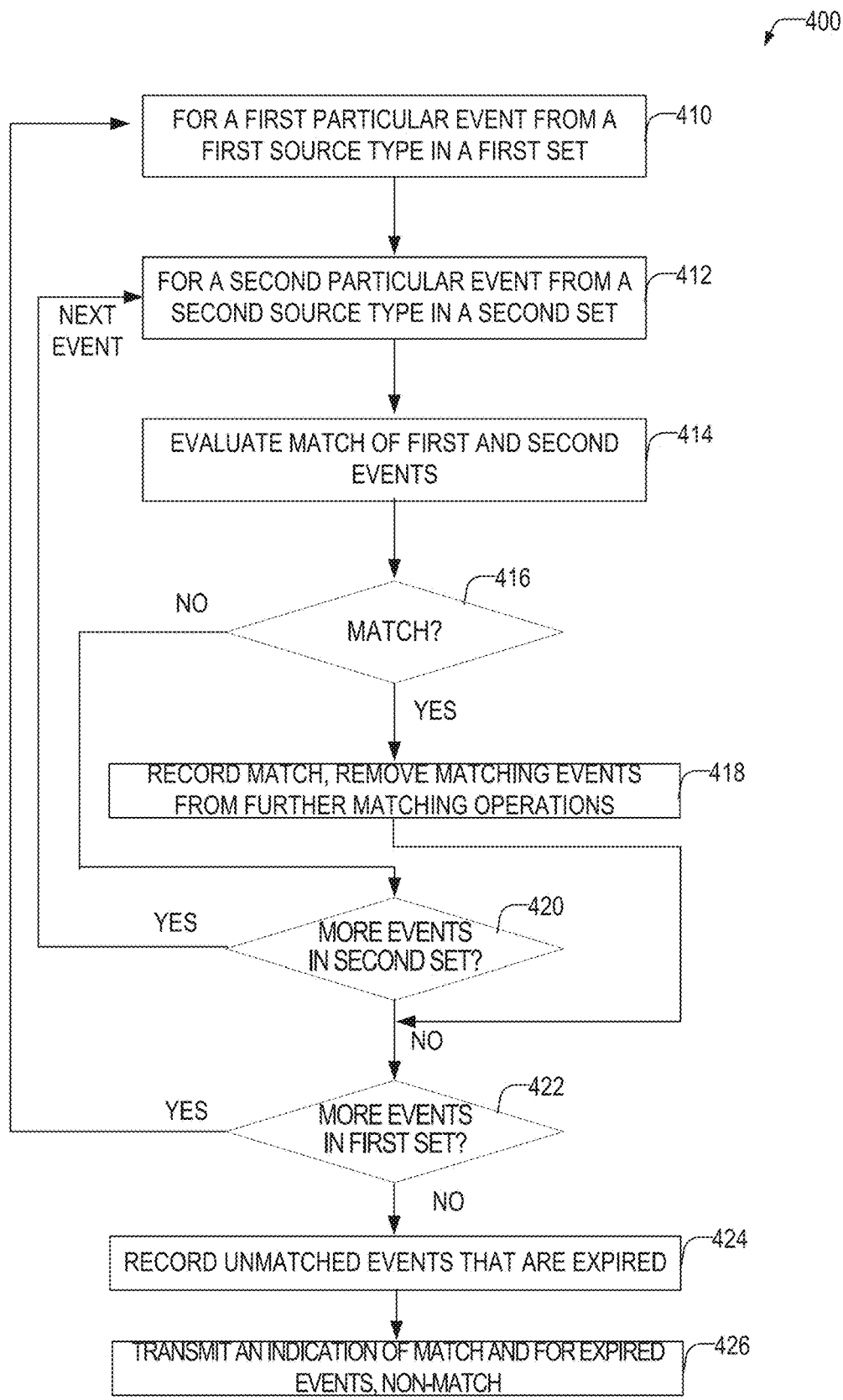
FIG. 4 illustrates a flowchart of a method of a detecting potential unauthorized file exfiltration according to some examples of the present disclosure.
Figure 5:
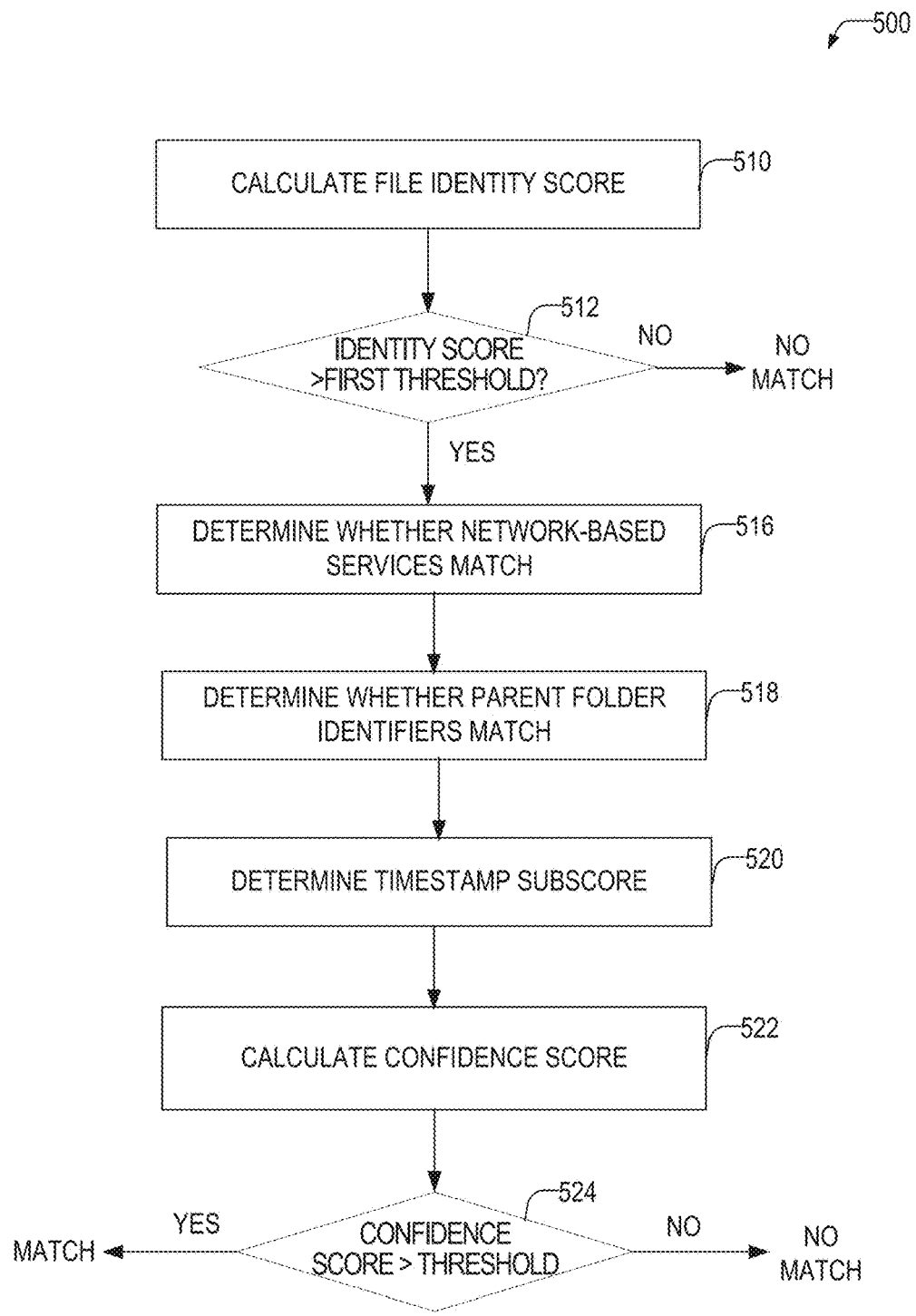
FIG. 5 illustrates a flowchart of a method of the match process according to some examples of the present disclosure.

In the example in which the system buffers events and looks for matches periodically, the system may determine whether each event from the first source type matches each other event from the second source type. In these examples, a first match may terminate further processing for the events matched (that is, a first event that matches a second event will not be compared with a third event to determine whether the first and third events match). FIG. 4 illustrates a flowchart of a method 400 of a match process according to some examples of the present disclosure. Method 400 illustrates a method of processing events when the system searches periodically for matches. At operation 410 a first particular event from the first set of file system element events is chosen. For example, a first event in the first set. At operation 412, a second particular event is chosen from the second set of file system element events. For example, a first event in the second set. The system may ensure that the first and second events correspond to a same user. At operation 414 the system calculates whether or not the first and second particular events correspond to a same file system element operation (they match). Put differently, the system evaluates whether the first event caused the second event or vice versa. For example, the user uploaded a file to a network-based service and the first event may be the upload event from the client device and the second event is the upload event of the network-based service. In another example, the user downloaded a file from a network-based service and the first event may be the download event from the client device and the second event may be the download event of the network-based service. FIG. 5 illustrates a matching method in some examples in more detail.

At operation 416 a determination is made as to whether the first and second events matched. If they match, then at operation 418 the system may record the match and remove the matching events from further matching operations. The system may mark the events in the event cache indicating that they match. The system may also log the events as matching. These logged events may be made available for later viewing by an administrator. In some examples, marked and/or logged events are not considered for matching with other events. Flow then proceeds to operation 422.

If there is not a match, then the system determines if there are more events in the second set at operation 420. If there are more events in the second set, the operations of 412, 414, 416, and conditionally operation 418 are repeated for a next event in the second set. If there are no more events in the second set, or there was a match at operation 416, the system determines if there are more events in the first set at operation 422. If there are more events in the first set, the operations of 410, 412, 414, 416, 420, and 422 and conditionally operation 418 is performed on a next event in the first set. Once there are no more events in the first set (e.g., all combinations of the first and second events from the first and second sets are scanned for a match), the system may record unmatched events that are expired at operation 424. That is, the system may indicate that the event is unmatched. At operation 426, the matched events, along with expired unmatched events may be transmitted to a second computing system (such as an alert service 116). In other examples, the system may generate one or more alerts based upon an unmatched event.

FIG. 5 illustrates a flowchart of a method 500 of the match process according to some examples of the present disclosure. Method 500 in some examples is an example of operations 316 and 416 according to some examples of the present disclosure. Method 500 operates on a first event and a second event, for example, a first event from the first source type and a second event from the second source type (or vice versa).

At operation 510 the system may calculate a file system element identity score. The identity score may be based upon whether metadata such as a file hash of a first file system element of the first event and a file hash of a second file system element of the second event match and how closely the file size of each matches. For example, the file hash may be of the contents of the file about which the event was triggered. The hash may be calculated using a hash algorithm such as a Secure Hash Algorithm, MD5, or SHA-256. The hashes may be included with the events sent by the file system element event monitor of the client computing device or the network-based service monitor. In some examples, if the hashes match, the system may assign a specified number of points to the identity score. The identity score may also be based upon how close the file sizes of the first and second events are. The closer the file sizes, the more points are added to the identity score. The file size is the size of the file about which the event was generated and is included with the event sent by the file system element event monitor of the client computing device or the network-based service monitor.

At operation 512, the identity score is compared to a first threshold. If the identity score is not above a first threshold, the matching algorithm may return a "no match." If the identity score exceeds the first threshold, then flow proceeds to operation 516.

At operation 516, the system may determine whether the network-based service matches in the event pair received from the network-based service monitor. That is, each event may include metadata identifying the network-based service. Operation 516 determines whether that network-based service matches between each event. The network-based service may be determined on the client computing devices using a destination folder of the file system element event (e.g., a file may have been moved to a sync folder used by the network-based service), a URL corresponding to the network-based service that was accessed by the network-based service application 132 (either a dedicated application or a browser) at the time of the event, or the like. The sync folders and/or URLs may be mapped to various network-based services using a defined mapping, registry settings, or the like. The network-based service may be determined for events from the network-based service monitor based upon which network-based service the event originated from.

At operation 518, the system may determine whether the parent folder identifier of the file system element corresponding to the events match. This may be determined, for example, on the client computing device based upon the folder location where the file system element event is placed, or for browser-based uploads, based upon an encoding within the URL associated with the event. The URL may be obtained by querying the browser for the URL history, scraping the screen of the browser, or the like.

At operation 520, the system may determine the timestamp subscore. The closer the timestamp of the first event and the second events are to each other, the higher this subscore. In some examples, this subscore may start out as a first value and then declines as a function of the time delta between when the first and second events occurred. Note that this timestamp is the detection timestamp—e.g., when the file system element event occurred as opposed to the time that the event arrived at the event processing service (the arrival time may be used to determine event expiry).

Based upon whether the destination network-based services match for each event, whether the parent folder identifiers match, whether the event types match, and the timestamp subscore, the system may calculate a confidence score at operation 522. For the parent folder identifiers, the event types, and destination network-based services, a match in these areas may add a certain number of points to the confidence score whereas no match may not add points or may subtract points. The timestamp subscore may be a variable number of points based upon the time delta between the timestamps. At operation 524, if the confidence score exceeds a threshold confidence score, then the system may determine that there is a match, otherwise the system may label the two events as not matching.

While the above system described an example in which the events either matched or they did not (based upon the confidence score exceeding a threshold), in some examples, the system may allow for multiple matching events. In these examples, in FIG. 4, the system may not remove matching events until all events in the second set have been considered. When all events in the second set have been considered, the system may select one of the candidate matches. In some examples, the system may select the candidate match with the highest confidence score. In these examples, the method 500 ends at operation 522 and there may not be a threshold comparison.

Figure 6:
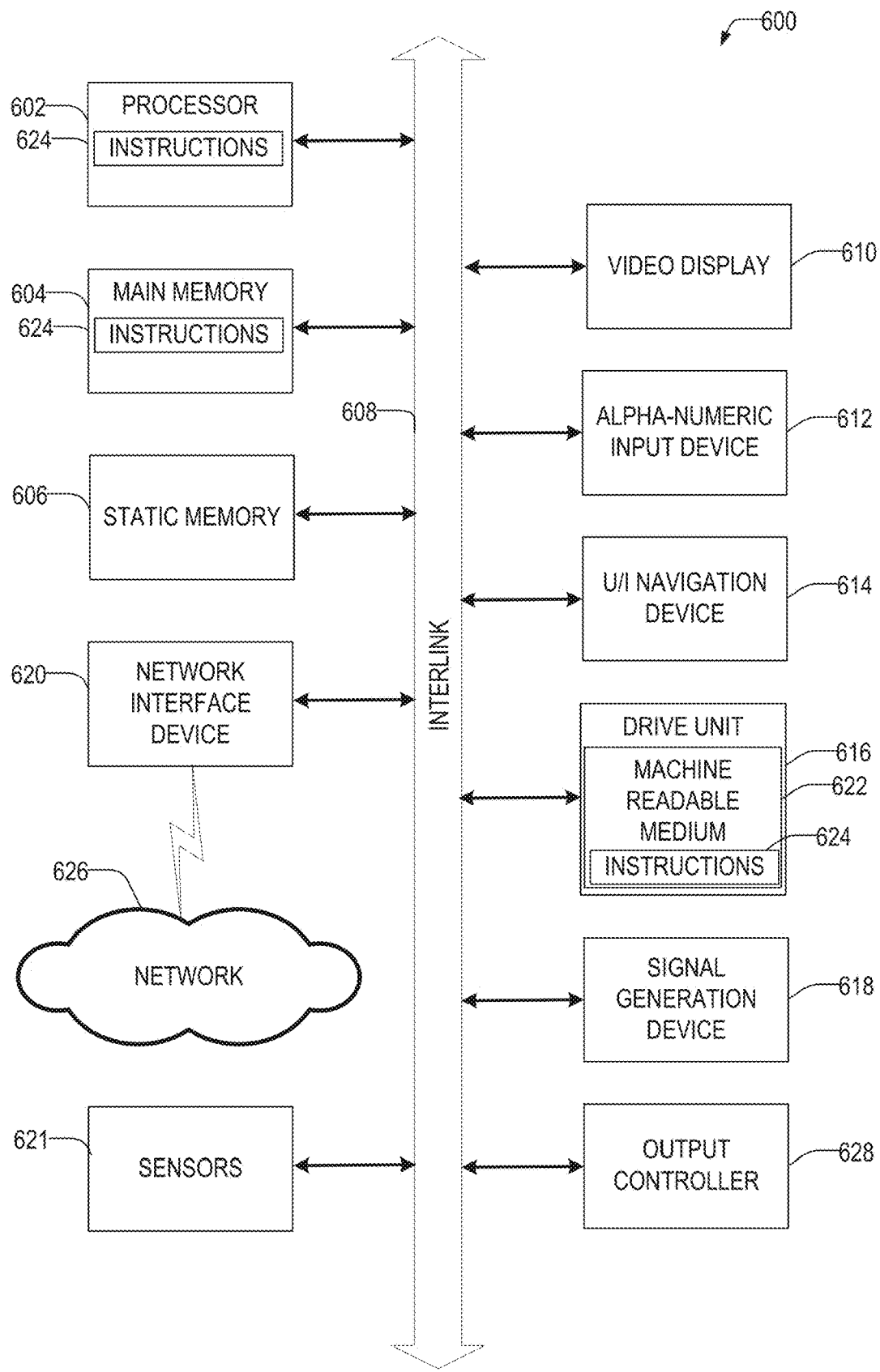
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 600 may implement or be configured as an event processing service 110, network-based service monitor 120, network-based service 140, and/or client computing device 130. Machine 600 may implement the event processing service 210 and be configured to perform the methods of FIGS. 3, 4, and 5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or another sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a method for detecting file system element exfiltration to or from a network-based service, the method comprising: receiving a first file system element event from a first source type, the first file system element event describing events associated with a file system element of a file system on the first source type, the first source type a client computing device or the network-based service; determining whether the first file system element event from the first source type matches any file system element events in a set of previously received file system element events from a second source type, the second source type being the client computing device when the first source type is the network-based service and the network-based service when the first source type is the client computing device; responsive to determining that the first file system element event from the first source type does not match any file system element events in the set of previously received file system element events from the second source type, tagging the first file system element event as unmatched; and transmitting, over a network, an indication that the first file system element event is unmatched to a computing device.

In Example 2, the subject matter of Example 1 includes, wherein responsive to determining that the first file system element event from the first source type does not match any file system element events in the set of previously received file system element events from the second source type, tagging the first file system element event as unmatched further comprises determining that a timestamp associated with the first file system element event has exceeded a specified threshold.

In Example 3, the subject matter of Examples 1-2 includes, raising an alert based upon the indication that the first file system element event is unmatched, the indication indicates that a file system element was uploaded to an unauthorized network-based service account if the first source type is the client computing device or that the file system element was downloaded to an unauthorized client computing device if the first source type is the network-based service.

In Example 4, the subject matter of Examples 1-3 includes, wherein determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second file system element events match.

In Example 5, the subject matter of Example 4 includes, wherein determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second events match and based upon a confidence score calculated using the first and second file system element events.

In Example 6, the subject matter of Example 5 includes, wherein the confidence score is calculated based upon one or more of a difference of when the first and second events occurred, a determination that the first and second events correspond to a same network-based service; or a determination that a parent folder id of the first and second events match.

In Example 7, the subject matter of Examples 4-6 includes, wherein the metadata of file system elements is a file hash.

In Example 8, the subject matter of Examples 1-7 includes, wherein the set of previously received file system element events are file system element events that were received within a specified time period.

Example 9 is a device for detecting file system element exfiltration to or from a network-based service, the device comprising: a processor; a memory, the memory storing instructions, which when executed by the processor, causes the device to perform operations comprising: receiving a first file system element event from a first source type, the first file system element event describing events associated with a file system element of a file system on the first source type, the first source type a client computing device or the network-based service; determining whether the first file system element event from the first source type matches any file system element events in a set of previously received file system element events from a second source type, the second source type being the client computing device when the first source type is the network-based service and the network-based service when the first source type is the client computing device; responsive to determining that the first file system element event from the first source type does not match any file system element events in the set of previously received file system element events from the second source type, tagging the first file system element event as unmatched; and transmitting, over a network, an indication that the first file system element event is unmatched to a computing device.

In Example 10, the subject matter of Example 9 includes, wherein the operations of, responsive to determining that the first file system element event from the first source type does not match any file system element events in the set of previously received file system element events from the second source type, tagging the first file system element event as unmatched further comprises determining that a timestamp associated with the first file system element event has exceeded a specified threshold.

In Example 11, the subject matter of Examples 9-10 includes, wherein the operations further comprise raising an alert based upon the indication that the first file system element event is unmatched, the indication indicates that a file system element was uploaded to an unauthorized network-based service account if the first source type is the client computing device or that the file system element was downloaded to an unauthorized client computing device if the first source type is the network-based service.

In Example 12, the subject matter of Examples 9-11 includes, wherein the operations of determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second file system element events match.

In Example 13, the subject matter of Example 12 includes, wherein the operations of determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second events match and based upon a confidence score calculated using the first and second file system element events.

In Example 14, the subject matter of Example 13 includes, wherein the confidence score is calculated based upon one or more of a difference of when the first and second events occurred, a determination that the first and second events correspond to a same network-based service; or a determination that a parent folder id of the first and second events match.

In Example 15, the subject matter of Examples 12-14 includes, wherein the metadata of file system elements is a file hash.

In Example 16, the subject matter of Examples 9-15 includes, wherein the set of previously received file system element events are file system element events that were received within a specified time period.

Example 17 is a non-transitory machine-readable medium, storing instructions for detecting file system element exfiltration to or from a network-based service, the instructions, when executed by a machine, cause the machine to perform operations comprising: receiving a first file system element event from a first source type, the first file system element event describing events associated with a file system element of a file system on the first source type, the first source type a client computing device or the network-based service; determining whether the first file system element event from the first source type matches any file system element events in a set of previously received file system element events from a second source type, the second source type being the client computing device when the first source type is the network-based service and the network-based service when the first source type is the client computing device; responsive to determining that the first file system element event from the first source type does not match any file system element events in the set of previously received file system element events from the second source type, tagging the first file system element event as unmatched; and transmitting, over a network, an indication that the first file system element event is unmatched to a computing device.

In Example 18, the subject matter of Example 17 includes, wherein the operations of, responsive to determining that the first file system element event from the first source type does not match any file system element events in the set of previously received file system element events from the second source type, tagging the first file system element event as unmatched further comprises determining that a timestamp associated with the first file system element event has exceeded a specified threshold.

In Example 19, the subject matter of Examples 17-18 includes, wherein the operations further comprise raising an alert based upon the indication that the first file system element event is unmatched, the indication indicates that a file system element was uploaded to an unauthorized network-based service account if the first source type is the client computing device or that the file system element was downloaded to an unauthorized client computing device if the first source type is the network-based service.

In Example 20, the subject matter of Examples 17-19 includes, wherein the operations of determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second file system element events match.

In Example 21, the subject matter of Example 20 includes, wherein the operations of determining whether the first file system element event from the first source type matches any file system element events in the set of previously received file system element events from the second source type further comprises: for a second file system element event in the set of previously received file system element events determine whether the first and second file system element events match based upon whether metadata of file system elements associated with the first and second events match and based upon a confidence score calculated using the first and second file system element events.

In Example 22, the subject matter of Example 21 includes, wherein the confidence score is calculated based upon one or more of a difference of when the first and second events occurred, a determination that the first and second events correspond to a same network-based service; or a determination that a parent folder id of the first and second events match.

In Example 23, the subject matter of Examples 20-22 includes, wherein the metadata of file system elements is a file hash.

In Example 24, the subject matter of Examples 17-23 includes, wherein the set of previously received file system element events are file system element events that were received within a specified time period.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A method for detecting file system element exfiltration to or from a network-based service, the method comprising:
receiving a first file system element event from a first source type, the first file system element event describing events associated with a file system element of a file system corresponding to the first source type, wherein the first source type is one of a client computing device or the network-based service;
determining whether the first file system element event from the first source type corresponds to any file system element events in a set of previously received file system element events corresponding to a second source type, wherein the second source type is the client computing device when the first source type is the network-based service and the network-based service when the first source type is the client computing device, wherein the determination is based at least in part on:
a comparison of an identifier indicative of an identity of a file system element associated with the first file system element event to identities of file system elements associated with the previously received file system element events, wherein the identifier is derived from one or more attributes of a corresponding file system element; and
a comparison of a timestamp associated with the first file system element event to timestamps associated with the previously received file system element events, wherein the events match only if the timestamps are within a predetermined time threshold of each other;
responsive to determining that the first file system element event from the first source type does not correspond to any of the file system element events in the set of the previously received file system element events from the second source type, tagging the first file system element event as unmatched; and
transmitting, over a network, an indication that the first file system element event is unmatched to a computing device.

2. The method of claim 1, wherein the one or more attributes of the corresponding file system element include at least one of a file hash, file size, file name, or file path.

3. The method of claim 1, further comprising generating an alert if the first file system element event remains unmatched after a second predetermined time threshold.

4. The method of claim 1, wherein the network-based service includes at least one of a cloud-based file storage system, an email service, or a communication service.

5. The method of claim 1, wherein the method further comprises utilizing a prefilter to correlate different accounts to a common account identifier for matching file system element events.

6. The method of claim 5, wherein the prefilter is configured to correlate different accounts to a common account identifier for matching file system element events using a predefined mapping table.

7. The method of claim 5, wherein the prefilter is configured to utilize one or more matching rules.

8. A computing device for detecting file system element exfiltration to or from a network-based service, the computing device comprising:
a hardware processor;
a memory, the memory storing instructions, which when executed by the hardware processor cause the computing device to perform operations comprising:
receiving a first file system element event from a first source type, the first file system element event describing events associated with a file system element of a file system corresponding to the first source type, wherein the first source type is one of a client computing device or the network-based service;
determining whether the first file system element event from the first source type corresponds to any file system element events in a set of previously received file system element events corresponding to a second source type, wherein the second source type is the client computing device when the first source type is the network-based service and the network-based service when the first source type is the client computing device, wherein the determination is based at least in part on:
a comparison of an identifier indicative of an identity of a file system element associated with the first file system element event to identities of file system elements associated with the previously received file system element events, wherein the identifier is derived from one or more attributes of a corresponding file system element; and
a comparison of a timestamp associated with the first file system element event to timestamps associated with the previously received file system element events, wherein the events match only if the timestamps are within a predetermined time threshold of each other;
responsive to determining that the first file system element event from the first source type does not correspond to any of the file system element events in the set of the previously received file system element events from the second source type, tagging the first file system element event as unmatched; and
transmitting, over a network, an indication that the first file system element event is unmatched to a second computing device.

9. The computing device of claim 8, wherein the one or more attributes of the corresponding file system element include at least one of a file hash, file size, file name, or file path.

10. The computing device of claim 8, wherein the operations further comprise generating an alert if the first file system element event remains unmatched after a second predetermined time threshold.

11. The computing device of claim 8, wherein the network-based service includes at least one of a cloud-based file storage system, an email service, or a communication service.

12. The computing device of claim 8, wherein the operations further comprise utilizing a prefilter to correlate different accounts to a common account identifier for matching file system element events.

13. The computing device of claim 12, wherein the prefilter is configured to correlate different accounts to a common account identifier for matching file system element events using a predefined mapping table.

14. The computing device of claim 12, wherein the prefilter is configured to utilize one or more matching rules.

15. A non-transitory machine-readable medium, storing instructions for detecting file system element exfiltration to or from a network-based service, the instructions, which when executed, cause a machine to perform operations comprising:
receiving a first file system element event from a first source type, the first file system element event describing events associated with a file system element of a file system corresponding to the first source type, wherein the first source type is one of a client computing device or the network-based service;
determining whether the first file system element event from the first source type corresponds to any file system element events in a set of previously received file system element events corresponding to a second source type, wherein the second source type is the client computing device when the first source type is the network-based service and the network-based service when the first source type is the client computing device, wherein the determination is based at least in part on:
a comparison of an identifier indicative of an identity of a file system element associated with the first file system element event to identities of file system elements associated with the previously received file system element events, wherein the identifier is derived from one or more attributes of a corresponding file system element; and
a comparison of a timestamp associated with the first file system element event to timestamps associated with the previously received file system element events, wherein the events match only if the timestamps are within a predetermined time threshold of each other;
responsive to determining that the first file system element event from the first source type does not correspond to any of the file system element events in the set of the previously received file system element events from the second source type, tagging the first file system element event as unmatched; and
transmitting, over a network, an indication that the first file system element event is unmatched to a computing device.

16. The non-transitory machine-readable medium of claim 15, wherein the one or more attributes of the corresponding file system element include at least one of a file hash, file size, file name, or file path.

17. The non-transitory machine-readable medium of claim 15, wherein the operations further comprise generating an alert if the first file system element event remains unmatched after a second predetermined time threshold.

18. The non-transitory machine-readable medium of claim 15, wherein the network-based service includes at least one of a cloud-based file storage system, an email service, or a communication service.

19. The non-transitory machine-readable medium of claim 15, wherein the operations further comprise utilizing a prefilter to correlate different accounts to a common account identifier for matching file system element events.

20. The non-transitory machine-readable medium of claim 19, wherein the prefilter is configured to map account identification information from the file system element events to the common account identifier based on a predefined mapping table.

\* \* \* \* \*